United States Patent
Luo et al.

(10) Patent No.: US 9,712,200 B2
(45) Date of Patent: Jul. 18, 2017

(54) NETWORK EQUIPMENT AND CONNECTOR THEREOF

(71) Applicant: Wistron NeWeb Corp., Hsinchu (TW)

(72) Inventors: Yi-Ting Luo, Hsinchu (TW); Yi-Cheng Wu, Hsinchu (TW); Chao-Chun Lin, Hsinchu (TW); San-Yi Kuo, Hsinchu (TW)

(73) Assignee: Wistron NeWeb Corp., Hsinchu (TW)

( * ) Notice: Subject to any disclaimer, the term of this patent is extended or adjusted under 35 U.S.C. 154(b) by 46 days.

(21) Appl. No.: 15/052,294

(22) Filed: Feb. 24, 2016

(65) Prior Publication Data
US 2016/0285202 A1    Sep. 29, 2016

(30) Foreign Application Priority Data

Mar. 26, 2015  (TW) .............................. 104109697 A

(51) Int. Cl.
| H04B 1/38 | (2015.01) |
| H01R 13/627 | (2006.01) |
| H01R 13/629 | (2006.01) |

(52) U.S. Cl.
CPC ............. *H04B 1/38* (2013.01); *H01R 13/627* (2013.01); *H01R 13/62905* (2013.01); *H01R 2201/04* (2013.01)

(58) Field of Classification Search
CPC .............. H01R 13/6395; H01R 13/623; H01R 2201/04; H04B 1/38
USPC ....................................................... 439/372
See application file for complete search history.

(56) References Cited

U.S. PATENT DOCUMENTS

| 6,439,902 B1 * | 8/2002 | Cole ................ H01R 13/62938 439/157 |
| 6,945,809 B2 * | 9/2005 | Ishigami .............. G02B 6/4201 439/352 |
| 7,052,306 B2 * | 5/2006 | Ishigami .............. G02B 6/4201 439/372 |
| 7,114,984 B2 * | 10/2006 | Shirk ............... H01R 13/62933 439/157 |
| 7,317,862 B2 * | 1/2008 | Minota ................ G02B 6/4292 385/134 |
| 7,448,899 B2 * | 11/2008 | Chen .................... G11B 5/4846 439/372 |
| 7,537,476 B1 * | 5/2009 | McColloch .......... G02B 6/4201 439/157 |
| 8,550,833 B2 * | 10/2013 | Martin ............... H01R 13/6395 439/310 |

(Continued)

*Primary Examiner* — Harshad Patel
(74) *Attorney, Agent, or Firm* — Muncy, Geissler, Olds & Lowe, P.C.

(57) ABSTRACT

A connector adapted to be connected to a network device is provided. The network device includes a connection port, and the connection port includes an elastic sheet. A wedging hole is formed on the elastic sheet. The connector includes a connector housing, a sliding element and a rotation element. The connector housing includes a latch. The latch is formed on the connector housing, and is adapted to be wedged into the wedging hole. The sliding element is moved between a first position and a second position along a straight line. When the sliding element is in the first position, the latch wedges into the wedging hole. When the sliding element is in the second position, the sliding element abuts the elastic sheet to separate the latch from the wedging hole. The rotation element is connected to the sliding element.

15 Claims, 10 Drawing Sheets

(56) References Cited

U.S. PATENT DOCUMENTS

| | | | |
|---|---|---|---|
| 2005/0059290 A1* | 3/2005 | Ishigami | G02B 6/4201 |
| | | | 439/372 |
| 2005/0282425 A1* | 12/2005 | Lloyd | G02B 6/4277 |
| | | | 439/372 |
| 2007/0123090 A1* | 5/2007 | Kim | G02B 6/4201 |
| | | | 439/372 |
| 2008/0057772 A1* | 3/2008 | Peng | H01R 13/6335 |
| | | | 439/372 |
| 2012/0045921 A1* | 2/2012 | Lo | H01R 13/635 |
| | | | 439/372 |

* cited by examiner

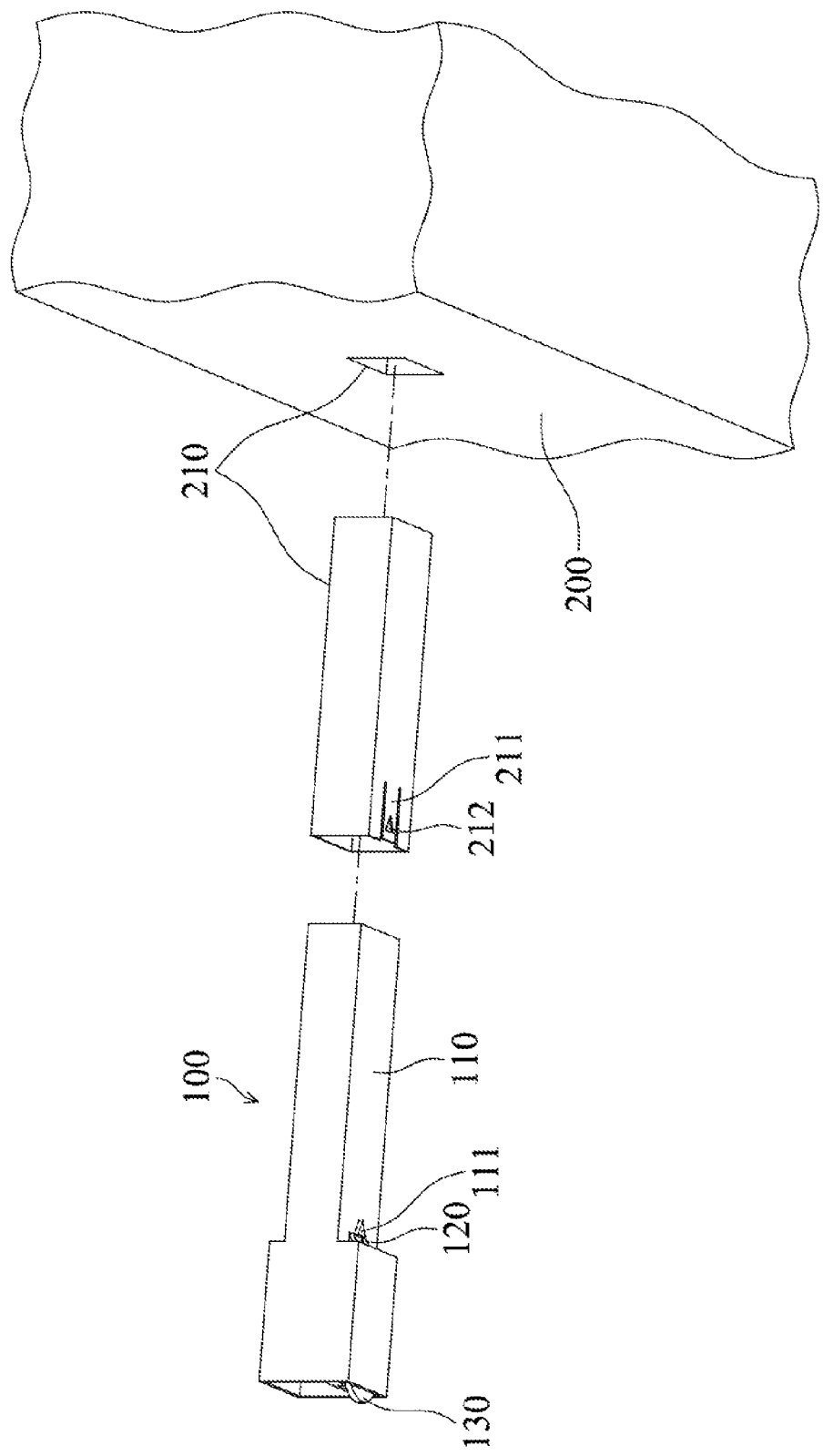

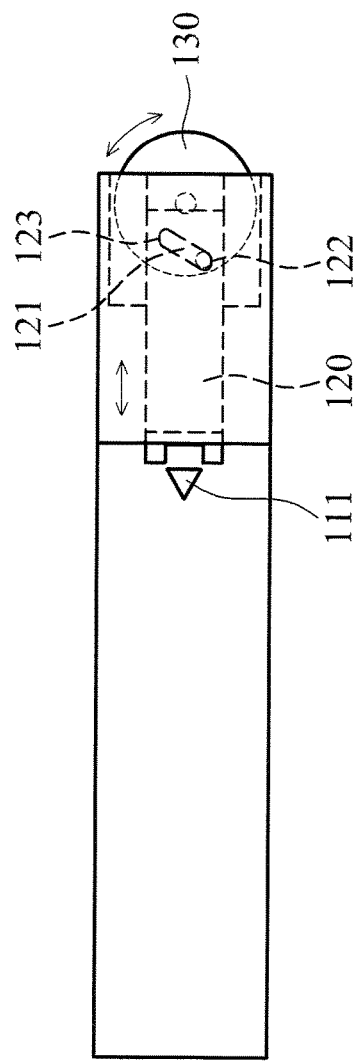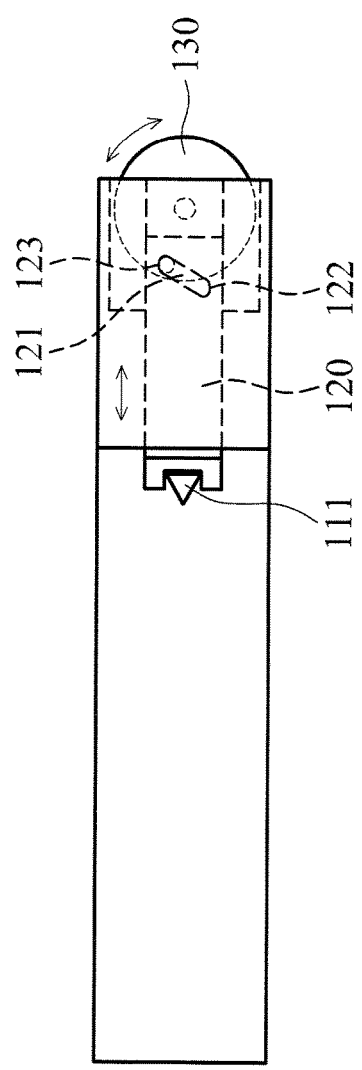
FIG. 4A
FIG. 4B

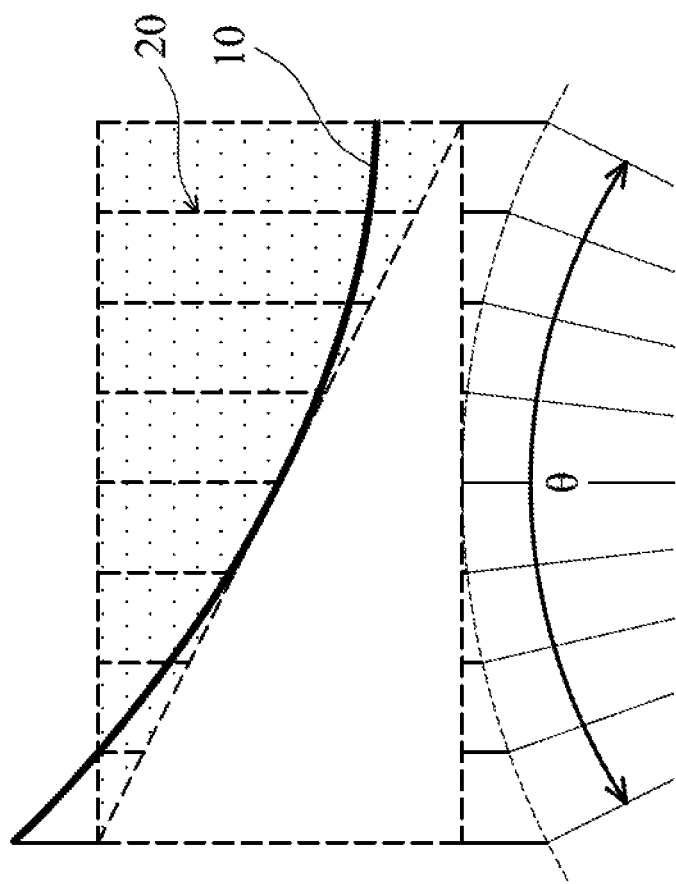

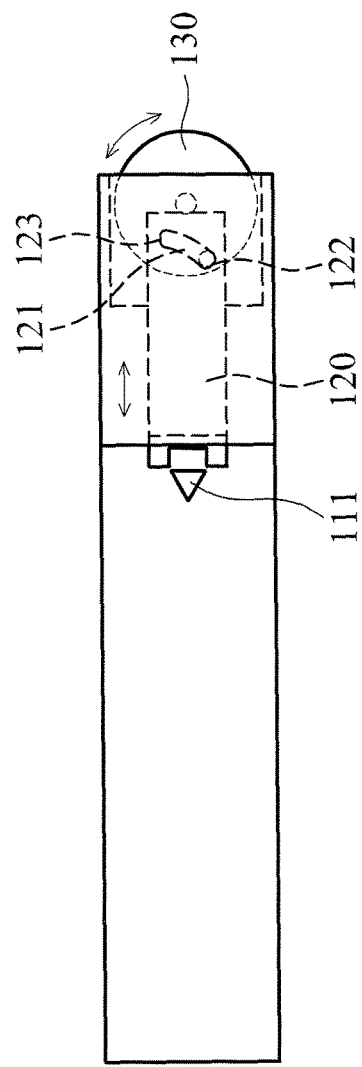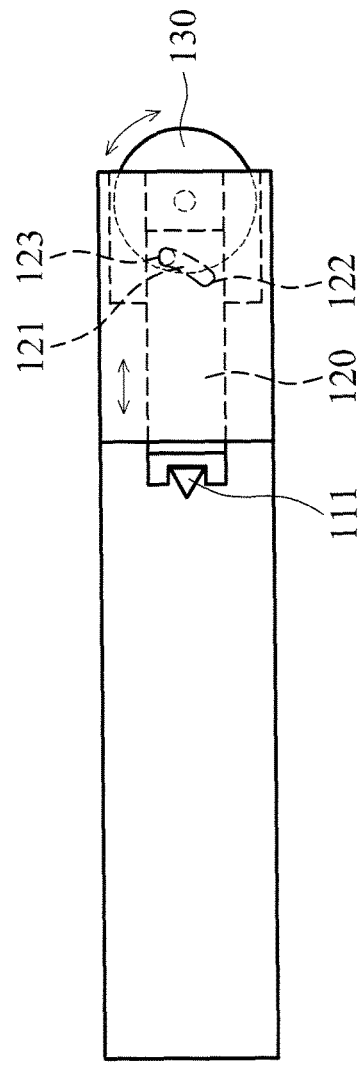

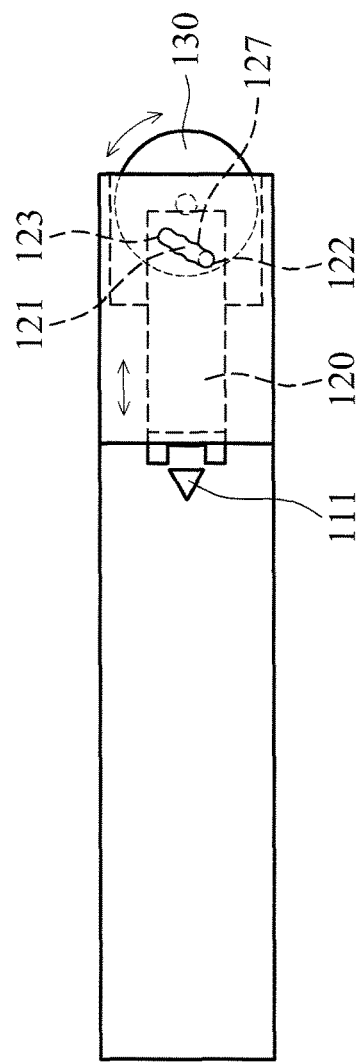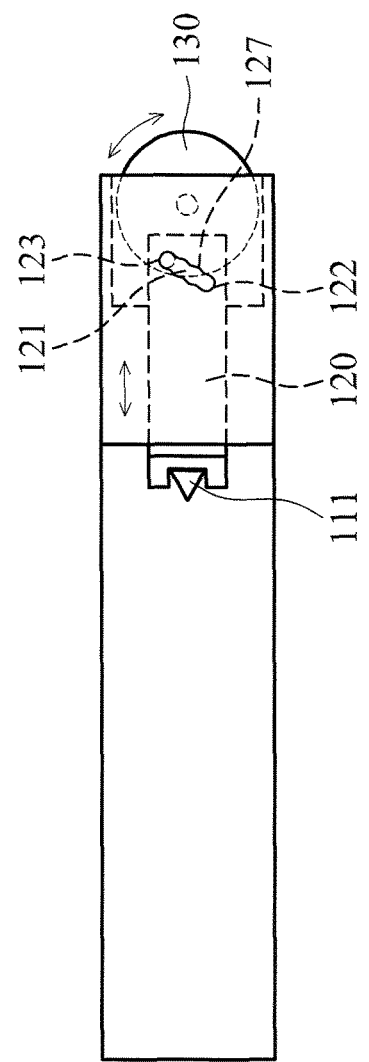

NETWORK EQUIPMENT AND CONNECTOR THEREOF

CROSS REFERENCE TO RELATED APPLICATIONS

This Application claims priority of Taiwan Patent Application No. 104109697, filed on Mar. 26, 2015, the entirety of which is incorporated by reference herein.

BACKGROUND OF THE INVENTION

Field of the Invention

The present invention relates to a connector, and in particular to a connector adapted to be connected to a network device Description of the Related Art A SFP transceiver (Small Form-factor pluggable Transceiver) is utilized to connect network devices such as a switch and router to transform and transmit photoelectric signals. The SFP transceiver can be released from the housing of a network device, and be replaced according to different cables (such as optical fiber and network cable). According to MSA (Multi-Source Agreement), the SFP transceiver comprises a wedging block that matches a wedging hole on the network device, and the SFP transceiver can be locked to or released from the network device. With the wedging block and the wedging hole, the SFP transceiver is prevented from being separated from the network device during data transmission.

However, the conventional SFP transceiver requires many complex elements to provide the lock-and-release functions, and the material usage and cost are increased.

BRIEF SUMMARY OF THE INVENTION

A connector adapted to be connected to a network device is provided. The network device comprises a connection port, and the connection port comprises an elastic sheet. A wedging hole is formed on the elastic sheet. The connector comprises a connector housing, a sliding element, and a rotation element. The connector housing comprises a latch formed on the connector housing, and the latch is adapted to be wedged into the wedging hole. The sliding element is moved between a first position and a second position along a straight line. When the sliding element is in the first position, the latch wedges into the wedging hole. When the sliding element is in the second position, the sliding element abuts the elastic sheet to separate the latch from the wedging hole. The rotation element is connected to the sliding element, wherein the rotation element is rotated between a first orientation and a second orientation. When the rotation element is in the first orientation, the sliding element is in the first position. When the rotation element is rotated from the first orientation to the second orientation, the rotation element pushes the sliding element from the first position to the second position.

Utilizing the connector of the embodiment of the invention, the number of mechanism elements can be decreased, and the material usage and the cost are decreased. Compared to the conventional art, the structures of the elements are simpler and more easily manufactured. Additionally, the outline of the connection slot is modified to provide different movements and functions.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 1 shows the connector of an embodiment of the invention;

FIG. 4A shows the rotation element in the first orientation;

FIG. 4B shows the rotation element in the second orientation;

FIGS. 6A, 6B and 6C show a modified embodiment of the invention;

FIGS. 8A and 8B show another modified embodiment of the invention.

DETAILED DESCRIPTION OF THE INVENTION

Figure 2A:
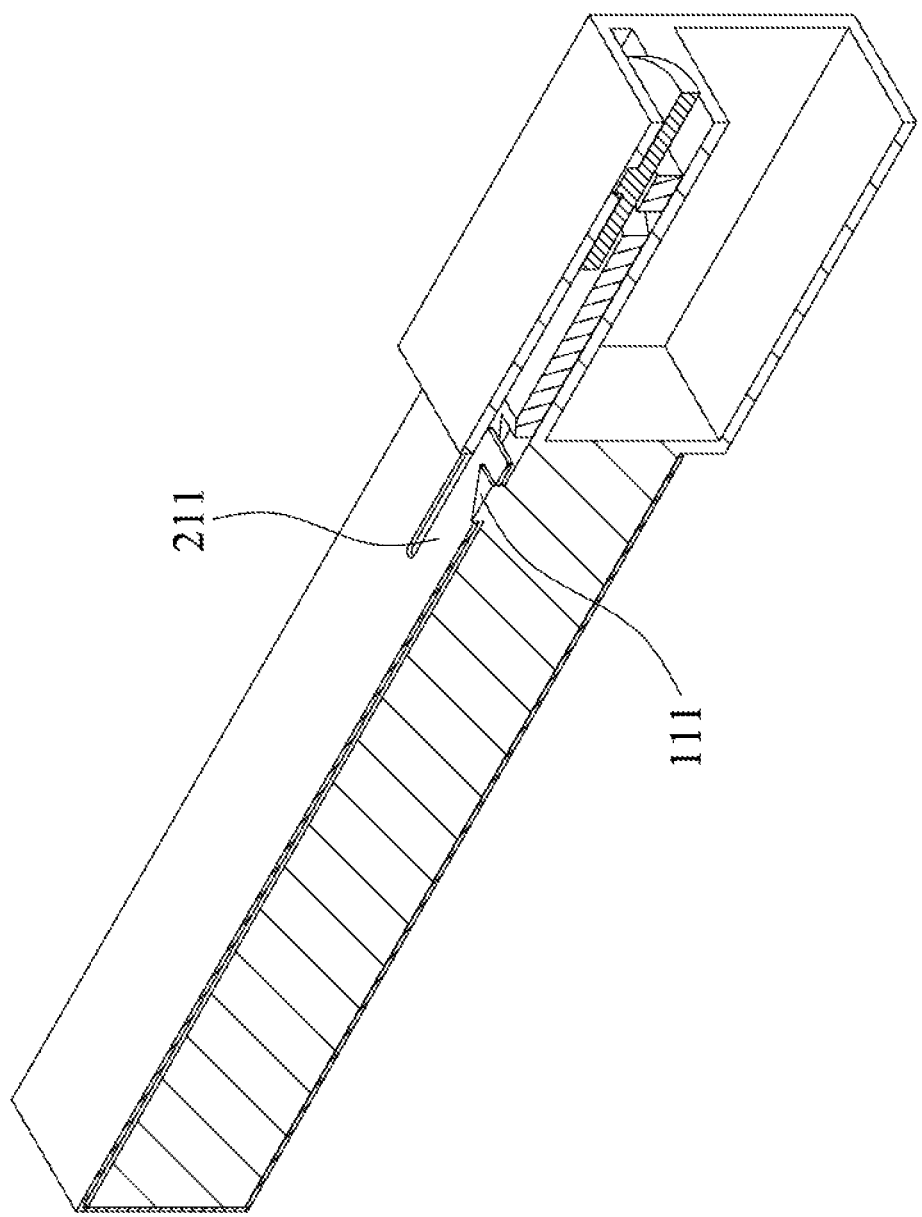
FIG. 2A shows the sliding element in the first position.

The following description is of the best-contemplated mode of carrying out the invention. This description is made for the purpose of illustrating the general principles of the invention and should not be taken in a limiting sense. The scope of the invention is best determined by reference to the appended claims.

FIG. 1 shows a connector 100 of an embodiment of the invention. The connector 100 is adapted to be connected to a network device 300. The network device 200 comprises a connection port 210. The connection port 210 comprises an elastic sheet 211, and a wedging hole 212 is formed on the elastic sheet 211. The connector 100 comprises a connector housing 110, a sliding element 120, and a rotation element 130. The connector housing 110 comprises a latch 111. The latch 111 is formed on the connector housing 110, and the latch 111 is adapted to be wedged into the wedging hole 212.

Figure 2B:
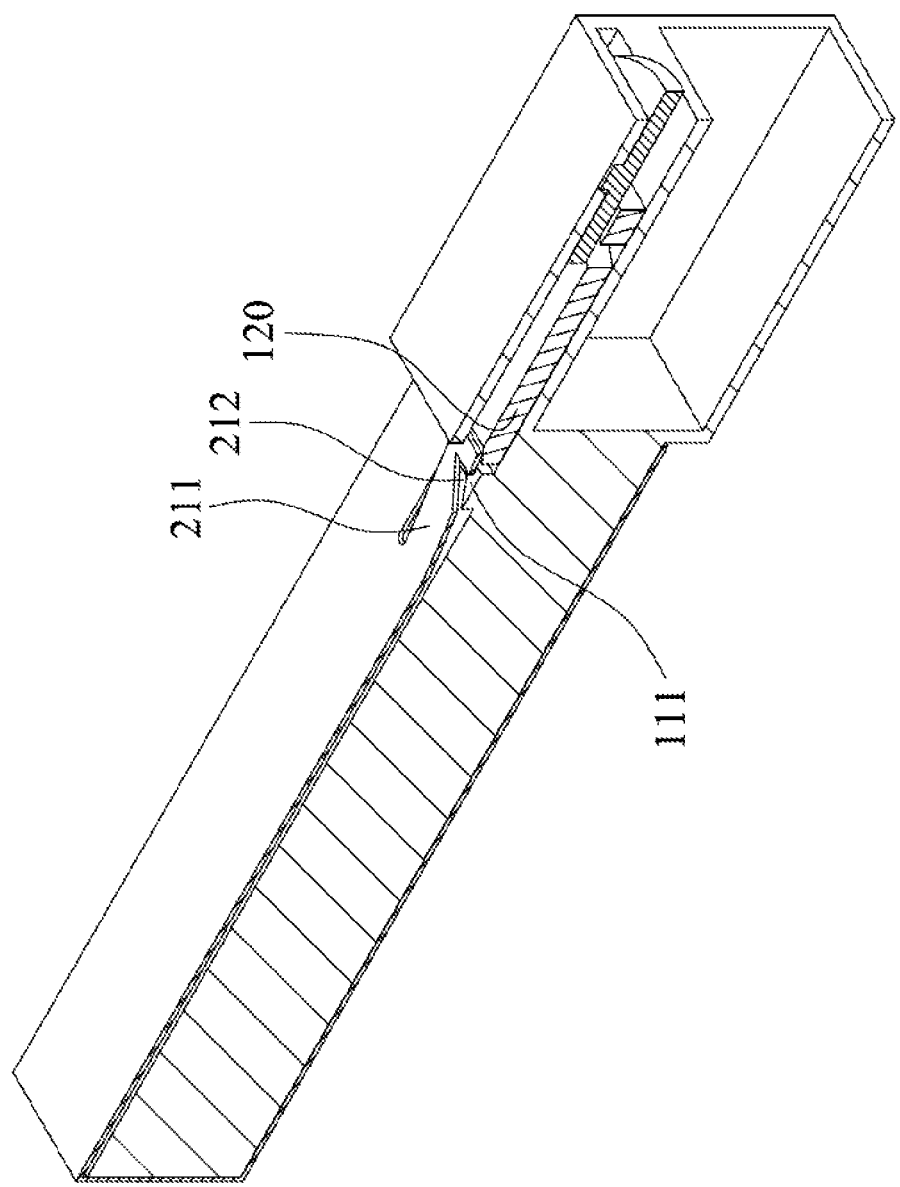
FIG. 2B shows the sliding element in the second position.

With reference to FIGS. 2A and 2B, the sliding element 120 is moved between a first position (FIG. 2A) and a second position (FIG. 2B) along a straight line. When the sliding element 120 is in the first position, the latch 111 wedges into the wedging hole 212. When the sliding element 120 is in the second position, the sliding element 120 abuts the elastic sheet 211 to separate the latch 111 from the wedging hole 212.

In one embodiment, according to MSA (Multi-Source Agreement), the wedging hole 212 is a triangular opening, and the latch 111 is a triangular block. The disclosure is not meant to restrict the invention. In one embodiment, the shape of the wedging hole matches the shape of the latch. For example, in a modified embodiment, the wedging hole 212 is a circular opening, and the latch 111 is a circular block.

Figure 3:
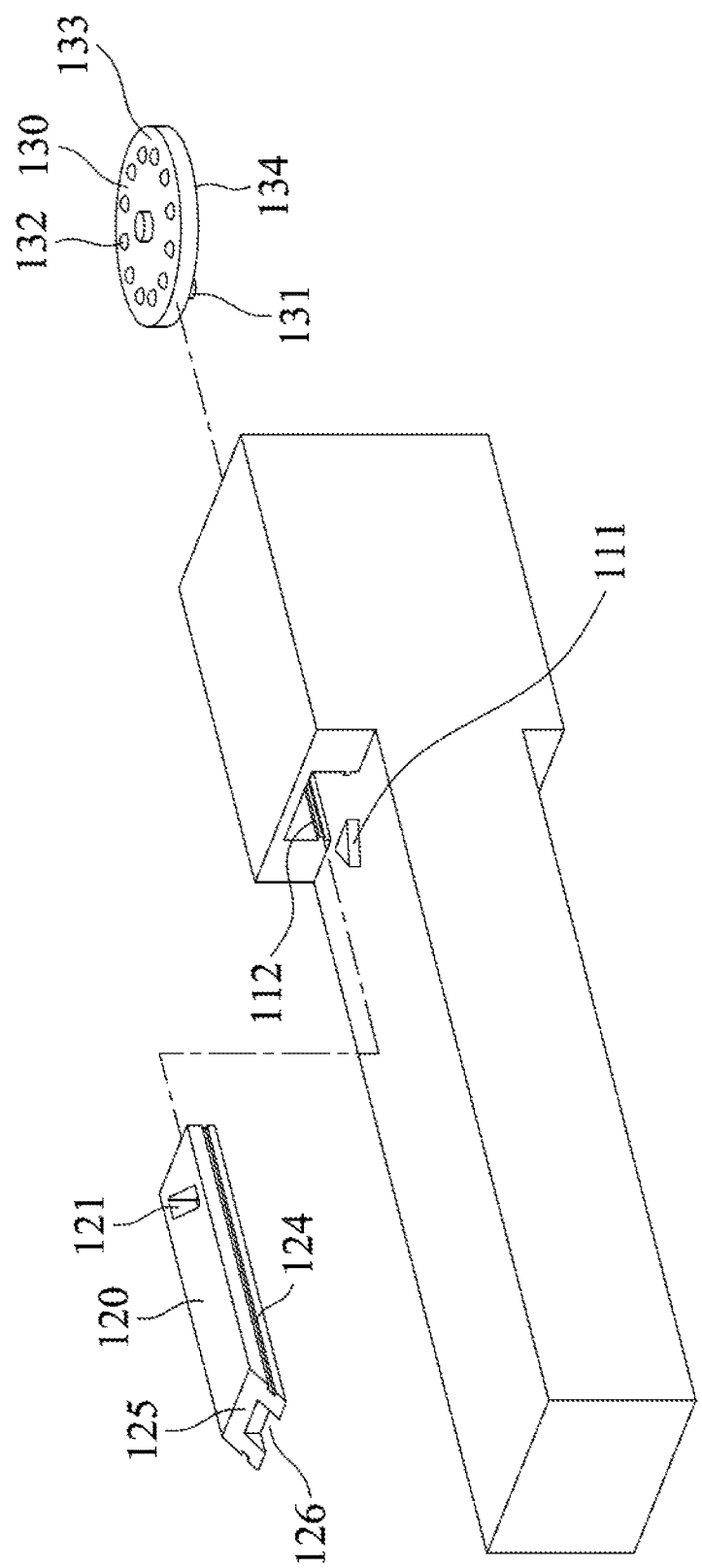
FIG. 3 is an exploded view of the connector of the embodiment of the invention.

FIG. 3 is an exploded view of the connector 100. The sliding element 120 comprises a connection slot 121. The rotation element 130 comprises a connection block 131, and the connection block 131 is inserted into the connection slot 121. The connection slot 121 comprises a first end 122 and a second end 123. With reference to FIGS. 3, 4A and 4B, the rotation element 130 is connected to the sliding element 120, wherein the rotation element 130 is rotated between a first orientation O1 (FIG. 2A) and a second orientation O2 (FIG. 2B). When the rotation element 130 is in the first orientation, the sliding element 120 is in the first position. When the rotation element 130 is rotated from the first orientation to the second orientation, the rotation element 130 pushes the sliding element 120 from the first position to the second position. When the rotation element 130 is in the first orientation, the connection block 131 is in the first end 122, and the sliding element 120 is in the first position. When the rotation element 130 is rotated from the first orientation to the second orientation, the connection block 131 is slid from the first end 122 to the second end 123 to push the sliding element 120 from the first position to the second position. In this embodiment, the connection slot 121 is longitudinal.

With reference to FIG. 3, the connector housing 110 comprises a guiding track 112, and the sliding element 120 comprises a guiding groove 124. The guiding track 112 is connected to the guiding groove 124, and the sliding element 120 slides between the first position and the second position along the straight line thereby. The sliding element 120 comprises an inclined surface 125. When the sliding element 120 is in the second position, the inclined surface 125 pushes the elastic sheet 211 to separate the latch 111 from the wedging hole 212. In one embodiment, a notch 126 is formed on the inclined surface 125, and when the sliding element 120 is in the second position, the latch 111 is located in the notch 126 to be prevented from interfering with the sliding element 120.

Figure 5:
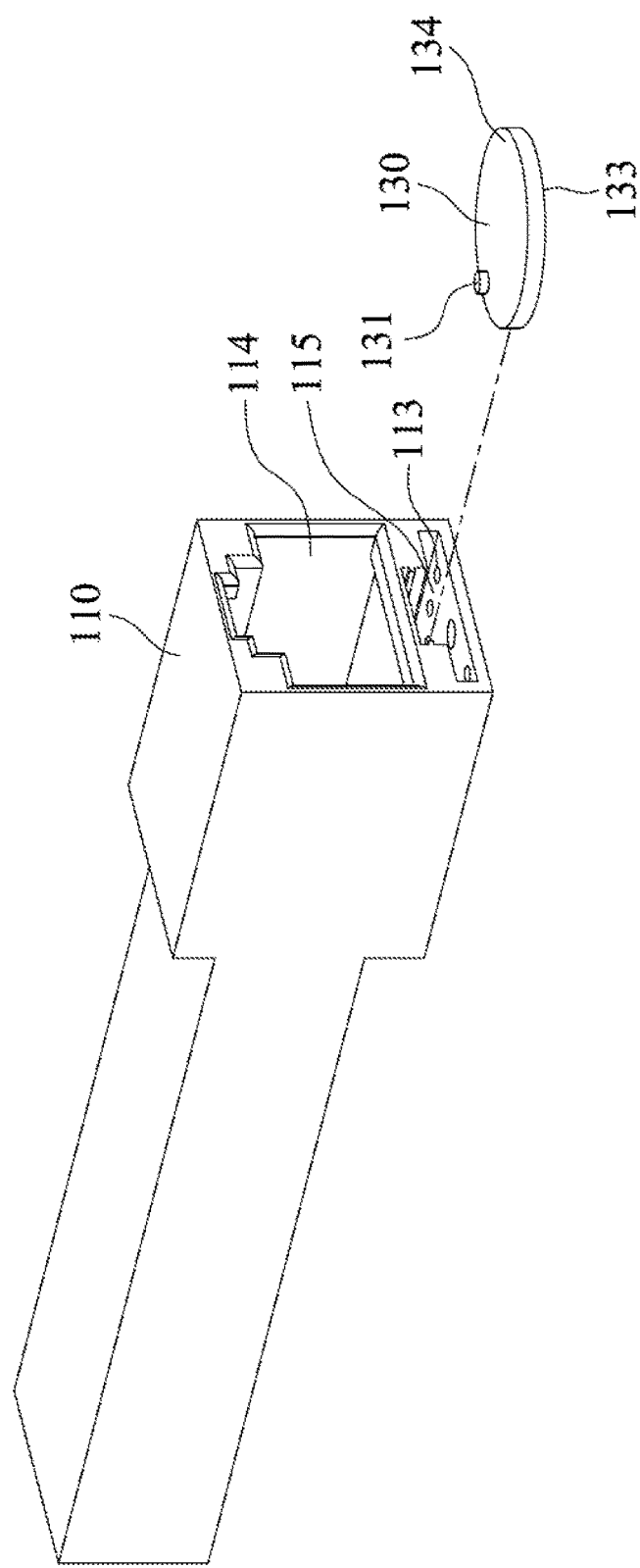
FIG. 5 shows the network cable-receiving recess and the rotation element-receiving recess.

With reference to FIG. 3, in one embodiment, the rotation element 130 is a plate. The plate 130 comprises a plurality of positioning protrusions 132, a first surface 133 and a second surface 134. The positioning protrusions 132 are disposed on the first surface 133, and the connection block 131 is disposed on the second surface 134. The first surface 133 is opposite to the second surface 134. With reference to FIG. 5, a plurality of positioning recesses 113 are formed on the connector housing 110, and the positioning recesses 113 match the positioning protrusions 132 to provide tactile sense.

With reference to FIG. 5, a network cable-receiving recess 114 and a rotation element-receiving recess 115 are formed at an end of the connector housing 110. The network cable-receiving recess 114 is adapted to connected to a network cable (not shown), the rotation element 130 is disposed in the rotation element-receiving recess 115, and a portion of the rotation element 130 is exposed out of the rotation element-receiving recess 115.

FIGS. 6A, 6B and 6C show modified embodiments of the invention, wherein the outline of the connection slot 121 is changed to control the displacement of the sliding element 120 in different ways. In the embodiments of FIGS. 6A, 6B and 6C, the connection slot 121 is curved. In FIG. 6, the outline of the connection slot 121 along is a curve line 10, and area 20 shows the displacement stroke of the sliding element 120. The rotation element 130 rotates angle θ to move the sliding element 120 at a constant speed.

Figure 7:
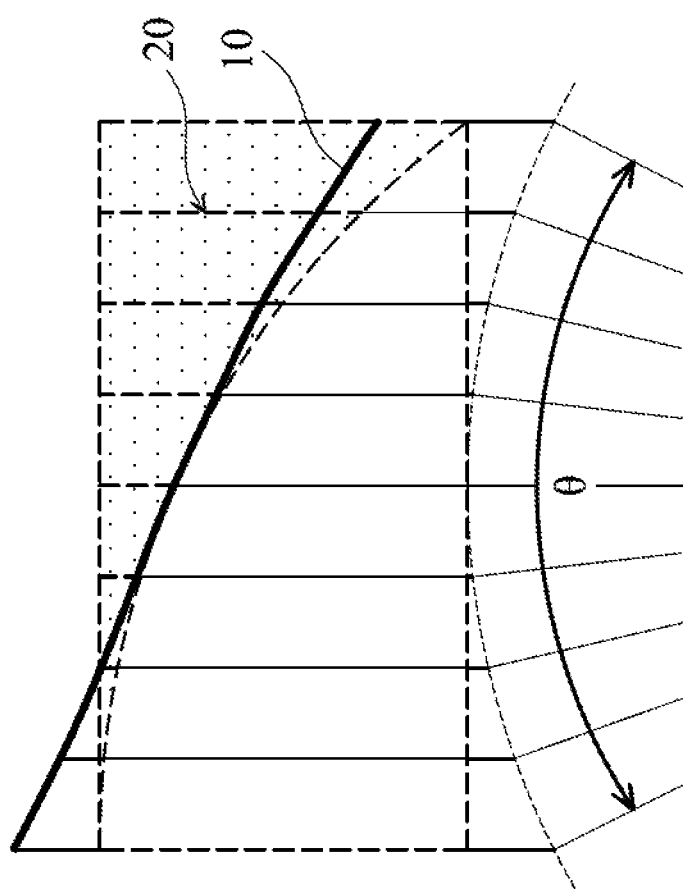
FIG. 7 shows another modified embodiment of the invention.

FIG. 7 shows another embodiment of the invention, wherein the outline of the connection slot 121 is changed, and the sliding element 120 is gradually moved faster.

FIGS. 8A and 8B show further another embodiment of the invention, wherein the connection slot 121 has a sawtooth edge 127 to increase the tactile sense. In this embodiment, the positioning recess 113 and the positioning protrusions 132 can be omitted.

Utilizing the connector of the embodiment of the invention, the number of mechanism elements can be decreased, and the material usage and the cost are decreased. Compared to the conventional art, the structures of the elements are simpler and more easily manufactured. Additionally, the outline of the connection slot is modified to provide different movements and functions.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A connector, adapted to be connected to a network device, wherein the network device comprises a connection port, the connection port comprises an elastic sheet, and a wedging hole is formed on the elastic sheet, comprising:
    a connector housing, wherein the connector housing comprises a latch, the latch is formed on the connector housing, and the latch is adapted to be wedged to wedging hole;
    a sliding element, moved between a first position and a second position along a straight line, wherein when the sliding element is in the first position, the latch wedges into the wedging hole, and when the sliding element is in the second position, the sliding element abuts the elastic sheet to separate the latch from the wedging hole;
    a rotation element, connected to the sliding element, wherein the rotation element is rotated between a first orientation and a second orientation, when the rotation element is in the first orientation, the sliding element is in the first position, and when the rotation element is rotated from the first orientation to the second orientation, the rotation element pushes the sliding element from the first position to the second position,
    wherein the sliding element comprises a connection slot, the rotation element comprises a connection block, the connection block is inserted into the connection slot, the connection slot comprises a first end and a second end, when the rotation element is in the first orientation, the connection block is in the first end, and the sliding element is in the first position, and when the rotation element is rotated from the first orientation to the second orientation, the connection block is slid from the first end to the second end to push the sliding element from the first position to the second position,
    wherein the rotation element is a plate, the plate comprises a plurality of positioning protrusions, a first surface, and a second surface, the positioning protrusions are disposed on the first surface, the connection block is disposed on the second surface, the first surface is opposite to the second surface, wherein a plurality of positioning recesses are formed on the connector housing, and the positioning recesses match the positioning protrusions.

2. The connector as claimed in claim 1, wherein the wedging hole is a triangular opening, and the latch is a triangular block.

3. The connector as claimed in claim 1, wherein the connection slot is longitudinal.

4. The connector as claimed in claim 1, wherein the connection slot is curved.

5. The connector as claimed in claim 1, wherein the connection slot has a sawtooth edge.

6. The connector as claimed in claim 1, wherein the connector housing comprises a guiding track, the sliding element comprises a guiding groove, the guiding track is connected to the guiding groove, and the sliding element slides between the first position and the second position along the straight line thereby.

7. The connector as claimed in claim 1, wherein the sliding element comprises an inclined surface, and when the sliding element is in the second position, the inclined surface pushes the elastic sheet to separate the latch from the wedging hole.

8. The connector as claimed in claim 7, wherein a notch is formed on the inclined surface, and when the sliding element is in the second position, the latch is located in the notch.

9. The connector as claimed in claim 1, wherein a network cable-receiving recess and a rotation element-receiving recess are formed at an end of the connector housing, the network cable-receiving recess is adapted to connected to a network cable, the rotation element is disposed in the rotation element-receiving recess, and a portion of the rotation element is exposed out of the rotation element-receiving recess.

10. A network equipment, comprising:
a network device, comprising a connection port, wherein the connection port comprises an elastic sheet, and a wedging hole is formed on the elastic sheet
a connector, connected to the network device, comprising:
a connector housing, wherein a latch is formed on the connector housing, and the latch is adapted to be wedged into a wedging hole;
a sliding element, moved between a first position and a second position along a straight line, wherein when the sliding element is in the first position, the sliding element is separated from the elastic sheet, and when the sliding element is in the second position, the sliding element abuts the elastic sheet to separate the latch from the wedging hole;
a rotation element, connected to the sliding element, wherein the rotation element is rotated between a first orientation and a second orientation, when the rotation element is in the first orientation, the sliding element is in the first position, and when the rotation element is rotated from the first orientation to the second orientation, the rotation element pushes the sliding element from the first position to the second position; and
a network cable, connected to the network device via the connector,
wherein the sliding element comprises a connection slot, the rotation element comprises a connection block, the connection block is inserted into the connection slot, the connection slot comprises a first end and a second end, when the rotation element is in the first orientation, the connection block is in the first end, and the sliding element is in the first position, and when the rotation element is rotated from the first orientation to the second orientation, the connection block is slid from the first end to the second end to push the sliding element from the first position to the second position,
wherein the rotation element is a plate, the plate comprises a plurality of positioning protrusions, a first surface and a second surface, the positioning protrusions are disposed on the first surface, the connection block is disposed on the second surface, the first surface is opposite to the second surface, a plurality of positioning recesses are formed on the connector housing, and the positioning recesses match the positioning protrusions.

11. The network equipment as claimed in claim 10, wherein the wedging hole is a triangular opening, and the latch is a triangular block.

12. The network equipment as claimed in claim 10, wherein the connection slot has a sawtooth edge.

13. The network equipment as claimed in claim 10, wherein the connector housing comprises a guiding track, the sliding element comprises a guiding groove, the guiding track is connected to the guiding groove, and the sliding element slides between the first position and the second position along the straight line thereby.

14. The network equipment as claimed in claim 10, wherein the sliding element comprises an inclined surface, and when the sliding element is in the second position, the inclined surface pushes the elastic sheet to separate the latch from the wedging hole.

15. The network equipment as claimed in claim 14, wherein a notch is formed on the inclined surface, and when the sliding element is in the second position, the latch is located in the notch.

* * * * *